Dec. 21, 1965        E. MUELBERGER, JR        3,224,111
PERSONAL IDENTIFICATION APPARATUS AND METHOD
Filed March 7, 1963                            6 Sheets-Sheet 1

INVENTOR.
ERIC  MUELBERGER JR.
BY
HIS ATTORNEY.

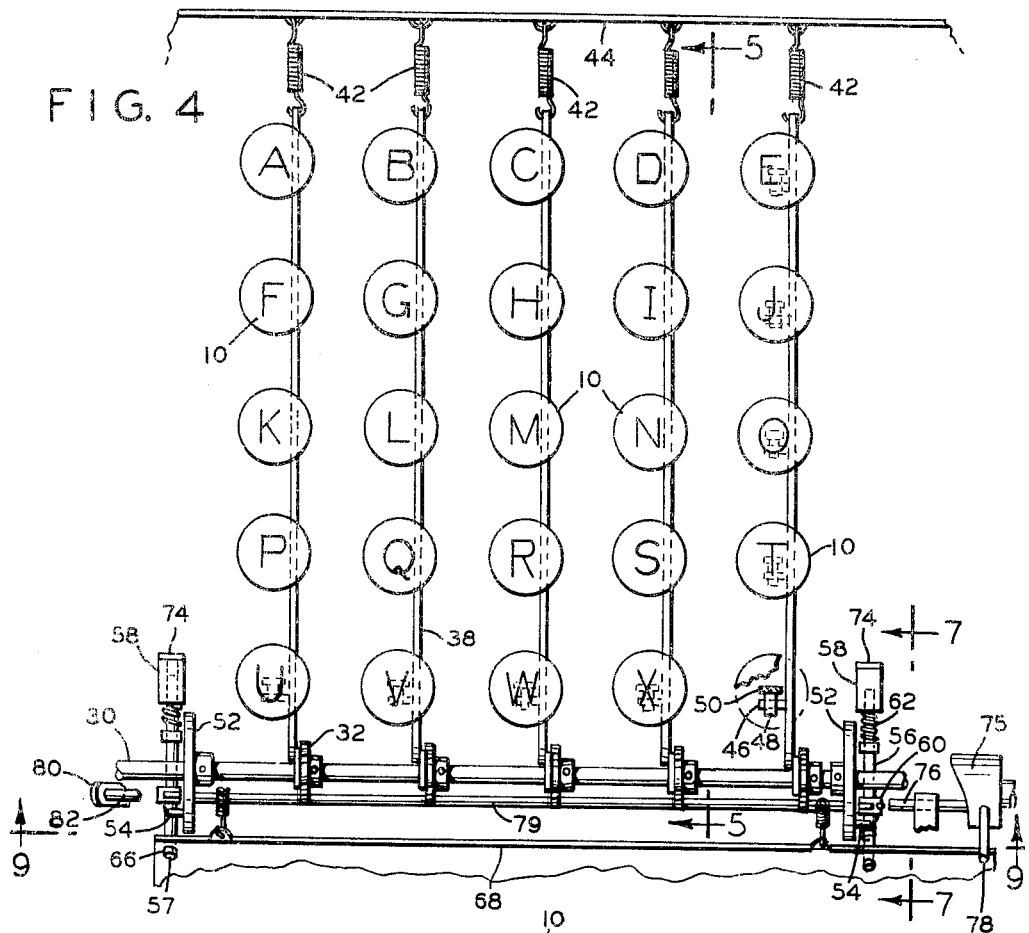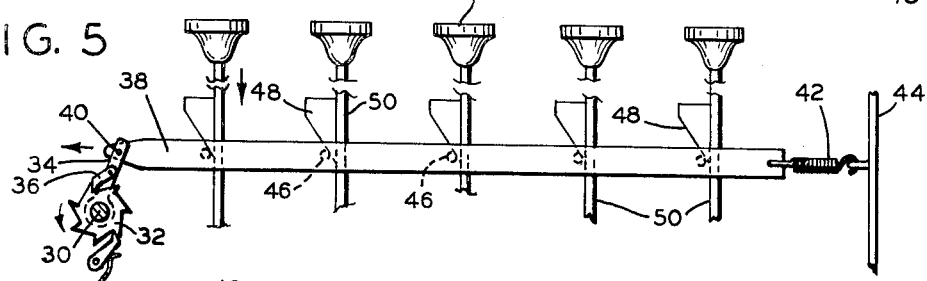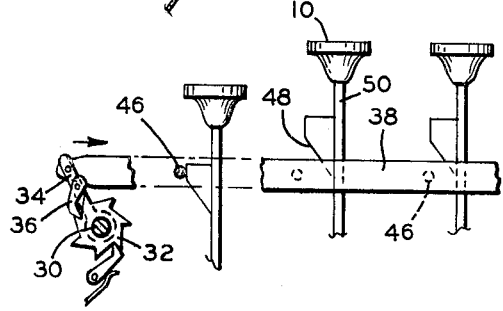

Dec. 21, 1965   E. MUELBERGER, JR   3,224,111
PERSONAL IDENTIFICATION APPARATUS AND METHOD
Filed March 7, 1963   6 Sheets-Sheet 3
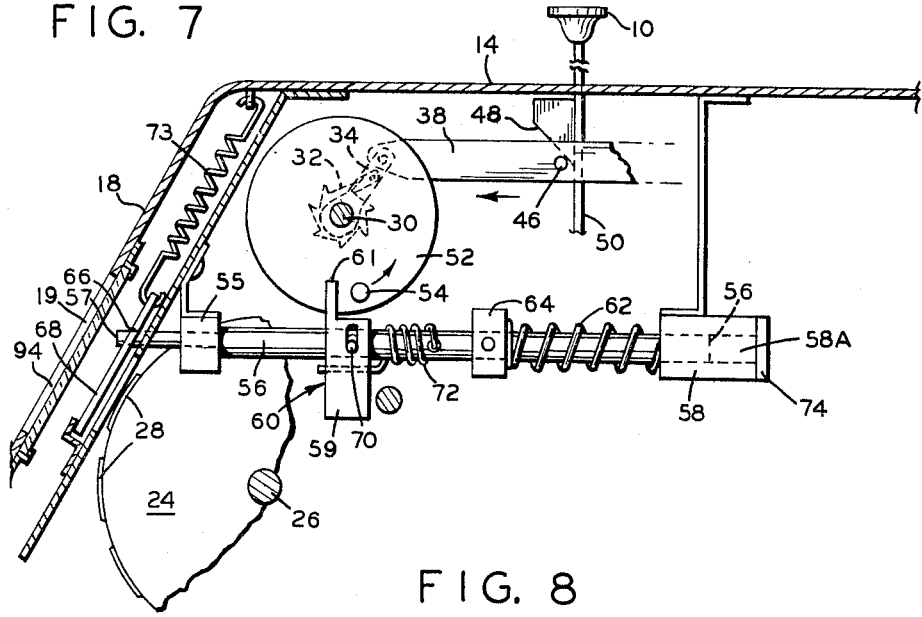
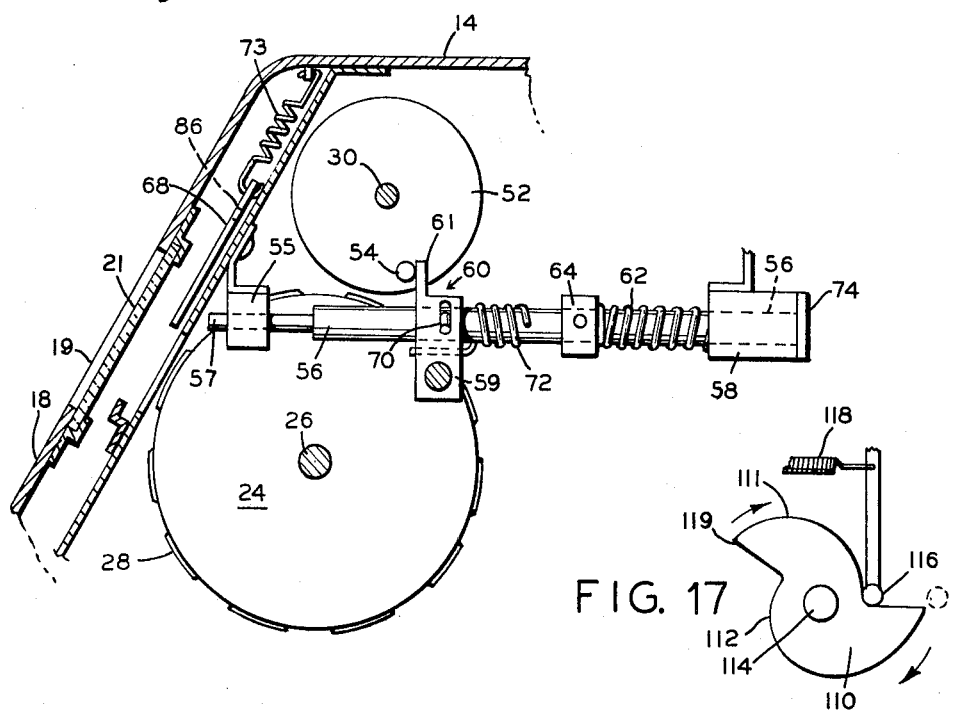
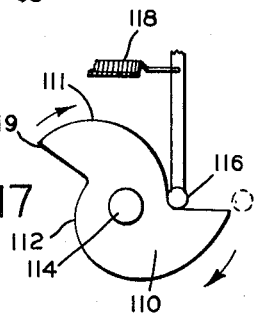
INVENTOR.
ERIC MUELBERGER JR.
BY John P. Chandler
HIS ATTORNEY.

INVENTOR.
ERIC MUELBERGER JR.
BY John P. Chandler
HIS ATTORNEY.

Dec. 21, 1965     E. MUELBERGER, JR     3,224,111
PERSONAL IDENTIFICATION APPARATUS AND METHOD
Filed March 7, 1963     6 Sheets-Sheet 5
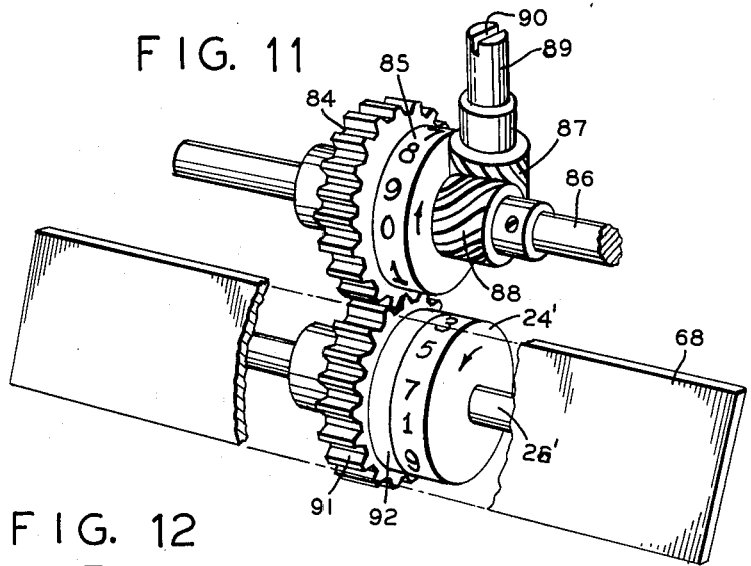
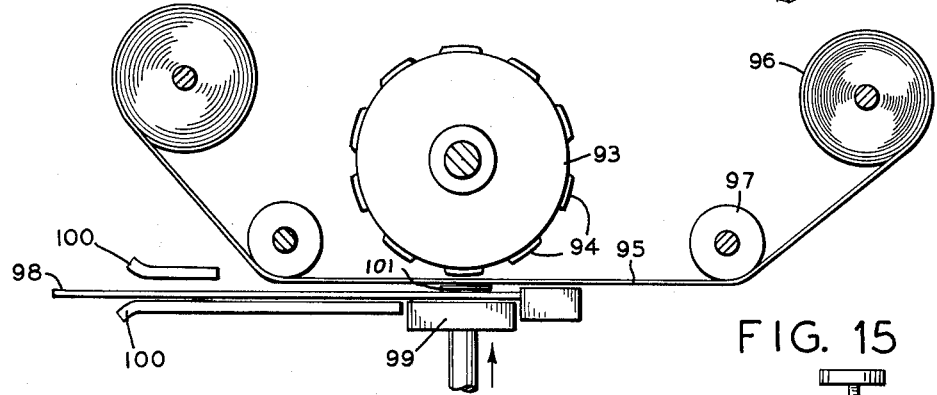
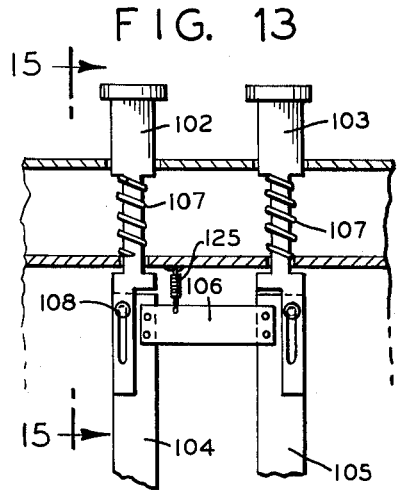
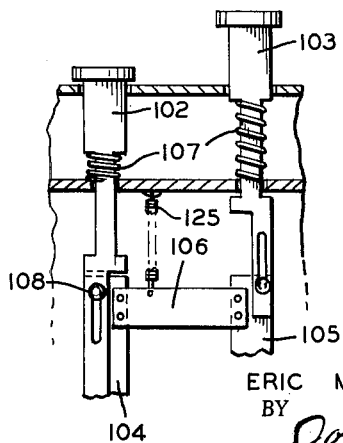
INVENTOR.
ERIC MUELBERGER JR.
BY John P. Chandler
HIS ATTORNEY.

Dec. 21, 1965  E. MUELBERGER, JR  3,224,111
PERSONAL IDENTIFICATION APPARATUS AND METHOD
Filed March 7, 1963  6 Sheets-Sheet 6

INVENTOR.
ERIC MUELBERGER JR.
BY John P. Chandler
HIS ATTORNEY.

United States Patent Office 3,224,111
Patented Dec. 21, 1965

3,224,111
PERSONAL IDENTIFICATION APPARATUS
AND METHOD
Eric Muelberger, Jr., P.O. Box 134, Colts Neck, N.J.
Filed Mar. 7, 1963, Ser. No. 263,658
5 Claims. (Cl. 35—3)

This invention relates to a personal identification system and involves the use of an identifying document or identification card bearing cryptic indicia, and a novel apparatus which provides means of establishing whether the person presenting the identifying document or card, or on whose behalf such document or card is presented, is in fact the person for whom such identification was originally issued. The system and apparatus of the present invention has important use for persons seeking credit accommodations or the cashing of checks although it will have other uses as well.

In its simplest form, the system involves the use of a novel apparatus resembling an adding machine but one wherein its adding function has been eliminated and the manually depressible keys arranged in rows have letters or other characters rather than numbers thereon. In other instances numbers may be used either alone or in combination with other indicia. The visible indicating wheels which normally would give a addition product in the case of an adding machine, employ various odd and unusual sequences of numbers or other indicia. The carry arrangement from one row of keys to the next may also have unconventional arrangements.

One or more such apparatus will be used in each place where some form of credit accommodation or identification for other purpose is required such as a bank, hotel, airline office, etc. Each customer has a card or document with a number or other cryptic indicia thereon which he presents to the service desk. It is to be understood that the term "document" as herein used may include official letters of introduction or identification, and various credit instruments such as credit cards, bank checks, drafts, letters of credit, travelers checks and the like which may be presented in person or otherwise forwarded to the place where positive personal identification is required.

The customer will also have exclusive knowledge of a coding sequence of his own selection which, when keyed into the machine, will be translated on the readout wheels to match the cryptic indicia on his document or card. The arrangement of the machine is such that knowledge of the cryptic indicia on the card, document or visible portion of readout wheels of the machine is of no assistance as a means of recreating the related keying selections required to match such indicia. Thus, if after the keying selections have been made, the resulting readout indicia appearing on the indicating wheels is the same as that appearing on his identification card, then the hotel or bank will have assurance that he is the person so identified. It will be apparent from the foregoing that a lost identification card or document is useless to anyone, other than the individual it serves to identify who may find it, since the cryptic indicia thereon bears no predictable or calculable relationship to the keying selections required to reproduce it on the output wheels of the apparatus.

In order that the scrambled indicia on the indicating or readout wheels will be seen by no one during the operation of punching the keys, a normally closed shutter conceals the wheels until the last key in the sequence is depressed. For instance, if words, actual or coined, of seven letters are employed in the sequence, a lever is actuated at the end of each sequence, and such lever in an ordinary manual adding machine would be the means for resetting the numbers to zero. In the machine of the present invention, moving this lever performs that function and in addition closes the shutter and resets the wheels to a concealed, cleared position, which may not necessarily be zeros. When the requisite seven keys have been depressed, the shutter opens and the keys then become locked so that no more keys can be depressed.

Another object, therefore, of the invention is to provide a shutter which is automatically closed when the machine is cleared and is automatically opened when the last key of the series, e.g., seven, has been depressed.

While visible readout wheels are preferred, it is also within the scope of the invention to have a printed readout.

It will be apparent from the foregoing that the novel machine of the present invention renders possible a system of identification which is more difficult to defraud than other known systems. Means are also provided on the machine for varying the readout possibilities so that it can be used for several different commercial groups. Thus, if a card representing a member of group A is presented, all the wheels can be shifted to a group A starting position, and when the keys representing a code word are now depressed in sequence the end result will be different from what it would be if all the wheels were shifted to a group B starting position. When a clearing lever is depressed at the end of a sequence, the readout wheels return to their normal starting position.

In the drawings:

FIG. 4 is a plan view of a ratchet and bar arrangement to cooperate with the keys.

FIG. 5 is an elevational view of a single ratchet and bar arrangement having five keys.

FIG. 6 is a view similar to FIG. 5 but showing a key in depressed position.

FIG. 7 is an enlarged sectional view taken along line 7—7 of FIG. 4.

FIG. 8 is a view similar to FIG. 7 but in forward or released position.

FIG. 11 is a modification showing individual means for setting each of the readout wheels.

FIG. 12 is a sectional elevation showing the use of a ribbon and printing method.

FIG. 13 is a modification showing a method of scrambling between keys.

FIG. 14 is a view similar to FIG. 13 but showing a key depressed.

FIG. 15 is a view taken along line 15—15 of FIG. 13.

FIG. 17 shows a cam which can be used to provide an unconventional carry arrangement.

Figure 1:
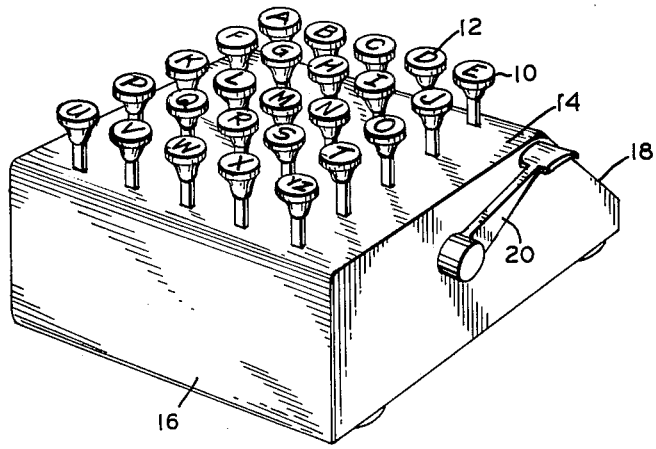
FIG. 1 is a perspective view of a typical machine.
Figure 2:
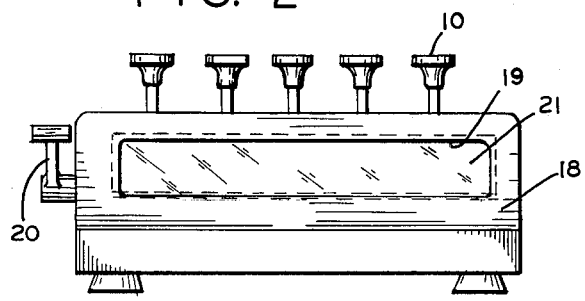
FIG. 2 is an elevational view of the same machine from the readout end.

There is shown in FIG. 1 a machine of a common type which is normally used as an adding machine. It has only a partial keyboard, i.e., five rows of five keys each. The keys 10 have letters in alphabetical sequences instead of numerals thereon and in the arrangement shown there are twenty-five keys each having a letter 12 thereon which gives a full alphabet when the Y and Z are placed on one key. The keys are mounted for vertical movement in a housing 14, the front wall 16 of which has no opening but the rear wall 18, which is inclined, has an opening 19 with a fixed window 21 positioned in the opening.

Machines of this general character and their internal mechanism are shown in Patent Nos. 1,917,732 and 1,983,945 and they have a lever 20 for clearing the numeral or readout wheels to zero or starting position. None of this conventional internal calculating mechanism is illustrated herein except for the numeral wheels 24 which are mounted for free rotation on a shaft 26 and may have toothed wheel (not shown) which are engaged by segmental racks. In a conventional adding machine these numerals would run consecutively from 0, 1, 2 to 9. In the machine of the present invention, however, these numerals 28 have a variously scrambled sequence and the numeral wheels are arranged to be visible through window 21 when the shutter, later described, is in its upward position. The mechanism of the foregoing patents or any other of the same general kind, as herein modified, may be used.

It may be pointed out that some of these mechanisms require that no more than one key in a single row be depressed at once. For the purpose of the present method, it is preferred that all the keys be depressed sequentially rather than two or more at one time.

Referring now to FIGS. 4 to 10, a key counter includes a shaft 30, journalled in bearings 31, and carries five ratchets 32 together with operating arm 34 which carries a pawl 36. A bar 38 reciprocably operates the arm 34 by virtue of its pivotal connection 40. The free end of the arm 38 is resiliently held by a spring 42 secured to a rear wall 44. Each bar 38 carries five pins 46 projecting perpendicularly to said arm. Each pin 46 is engaged by a cam 48 which is carried on each key shank 50. The shaft 30 carries two spaced-apart discs 52. Each disc is provided with a pin 54 projecting from the side thereof and the disc and pin constitute a first member which turn in increments as the keys are depressed. Adjacent each disc 52 is located a rod 56 journalled in bearings 55 and 58. A bell crank type of lever 60, mounted upon the rod 56, has a protruding upper ear 61 which projects into the pathway of the pin 54 as the disc which carries it rotates in successive increments, so that as pin 54 strikes the protruding upper ear 61 it causes the rod 56 to move longitudinally. This shaft and the bell crank lever constitute a second member actuated by the first member. A spring 62 pressing against a collar 64 on the rod 56 resiliently urges the rod rearwardly. The rearward end 57 of the rod 56 has a reduced diameter to normally project through a hole 66 in a shutter 68. In this manner the shutter 68 is held in closed position so that it would be impossible to read any of the characters 28 on the readout wheels 24 which would normally be visible through window 21 in the machine casing.

Figure 9:
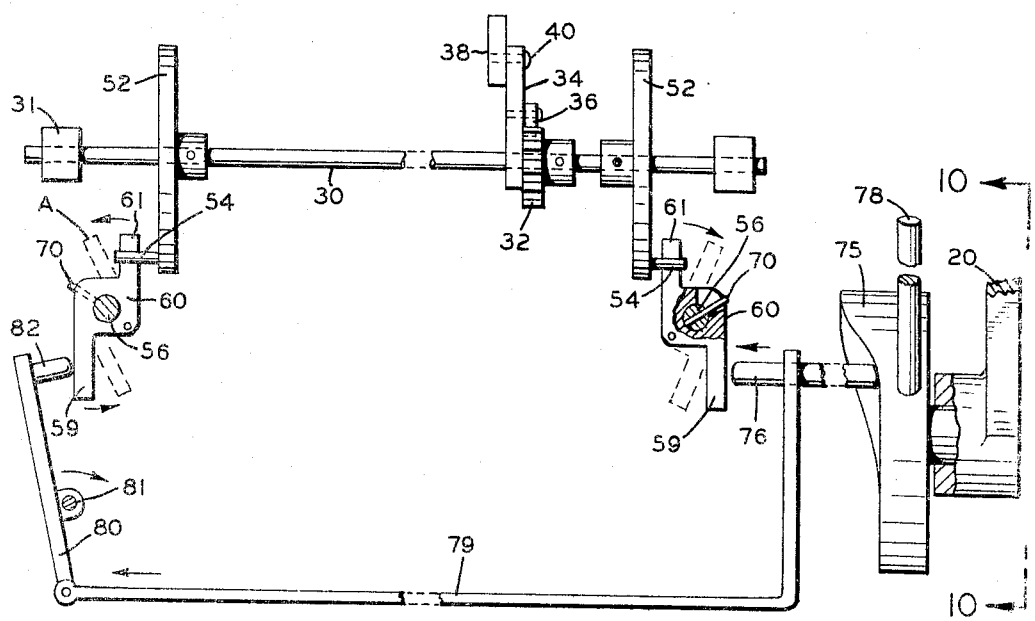
FIG. 9 is a view taken along line 9—9 of FIG. 4.
Figure 10:
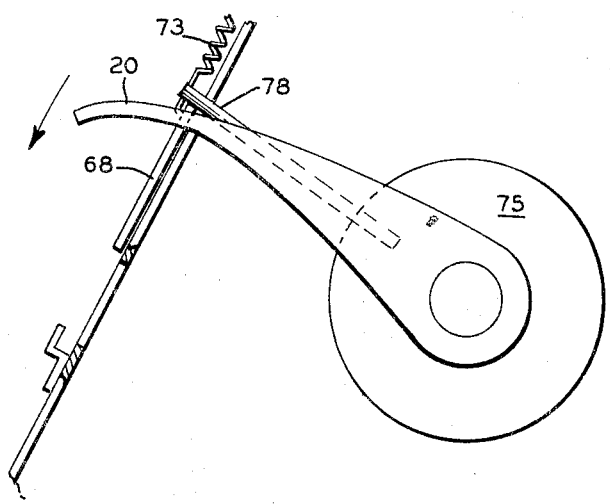
FIG. 10 is a view taken along line 10—10 of FIG. 9.

It will be noted that the bell crank lever 60 is mounted upon the rod 56 in such manner that it can have a small amount of angular motion about rod 56 limited by a stop pin 70 as best shown in FIG. 9. A spring 72 attached at one end to the rod 56 and at the other end to the lower arm of the bell crank lever 60 to resiliently hold the lever normally aaginst the stop pin 70. A plate 74 is secured to the end of the bearing 58 covering opening 58a in which the rod 56 slides so that when the rod 56 is in forward or released position (FIG. 8) it engages plate 74 which acts as a stop. All of the keys are now locked since an effort to depress a key would cause cams 48 to transmit motion from bars 38 to longitudinal movement of rod 56 which now can move no more.

When the rod 56 has been moved into forward or released position as shown in FIG. 8 the shutter 68 is raised by virtue of a spring 73 permitting the numerals 28 to be visible through the window 21. The forward or released position is obtained after depressing one or more keys seven times.

Upon actuating the reset lever 20 a cam 75 is rotated, moving a pin 76 in a direction to strike the bottom arm 59, thus rotating bell crank lever 60 and moving upper ear 61 into dotted position A in FIG. 9 out of the path of pin 54 allowing the rod 56 to be urged rearwardly into shutter engaging position by virtue of spring 62. A pin 78 projecting radially from the cam 75 is arranged to press against the shutter 68 as the reset lever 20 is depressed, returning the shutter to closed position (FIG. 7) and permitting the shaft end 57 to enter the hole 66 in the shutter 68 thus securing it in closed position.

The pin 76 has attached thereto an extension arm 79 (FIG. 9) the free end of which connects to a lever 80 pivoting at 81 to operate the bell crank lever 60 by virtue of pin 82 attached to the free end of the lever 80 on the opposite side of the machine.

It was earlier pointed out that the customer's code word which he punches out on the machine is his alone and may be known only to him. Not only that, but he may so select a word or a certain succession of letters having no meaning. He will punch them out and the result he obtains is then his readout number to be placed on his identification card or document. Accordingly, it will be seen that no one else has any need for ever knowing his code word or combination of letters and will in fact never know it unless he chooses to tell them.

The range of selection possibility is enormous and it can be a succession of letters having some intimate association with the person or otherwise. The number of letters in the code word is also wholly a matter of choice. If seven letters are required for a sequence, the code word can have more than seven letters and only the first seven utilized. Likewise if a code word is chosen having only four letters the first three, for example, may be repeated to complete the required sequence of seven.

In FIG. 11 there is shown a means for varying the results on the readout wheels. The readout wheels 24' mounted on shaft 26' are arranged to be covered by shutter 68. A gear 84 carrying a numeral wheel 85 with consecutive numerals thereon and mounted fast on a shaft 86 can be rotated to an adjusted, fixed position by a worm 87 which drives a worm gear 88 also fast on shaft 86. A shaft 89 having a tool receiving slot 90 rotates the worm. The slot is accessible through an opening in the housing (not shown) and wheel 85 with consecutive numerals is also visible. The readout wheel 24' is shown as having scrambled numbers but it may have consecutive numbers and other scrambling devices used such as are shown in FIGS. 13–15.

Gear 84 drives a meshing gear 91 which in turn drives readout wheel 24' through a unidirectional clutch or pawl and ratchet element 92. The purpose of the latter is to permit readout wheel 24' to rotate in its intended direction free of hindrance from gear 91. By making an occasional new setting on all or a portion of the wheels, the previous identification numbers become obsolete.

The results on visible readout wheels can also be printed on a card. FIG. 12 shows a printing arrangement and the printing wheel 93 has numerals 94 in reverse from those on the visible wheel and inking is effected by a ribbon 95 mounted on spools 96 and passing around idlers 97. A platen 98 is urged upwardly by a press member 99. A throat for a card (not shown) is formed by plates 100. If desired a movable plate 101, operated like shutter 68 may be used to prevent printing until the end of a sequence.

Figure 16:
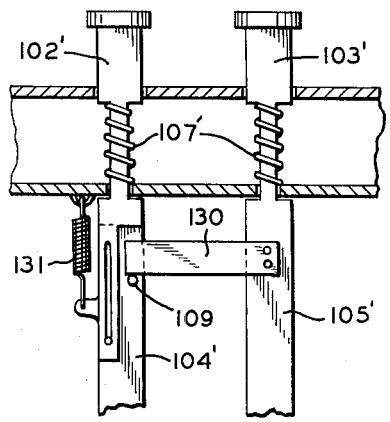
FIG. 16 shows a further method of scrambling between keys.

FIGS. 13 to 15 show a further means of scrambling the readout indicia. Two depressible keys 102 and 103, either in the same row or in two adjoining rows are mounted in spaced frame elements. Keys 102 and 103 have lower extensions 104 and 105 connected by a cross piece 106. Springs 107 return the keys. Keys 102 and 103 have pin and slot connections 108 with their extensions 104 and 105. Either key which is depressed will actuate the other one without this fact being apparent to either an onlooker or to the operator. The extensions are returned by spring 125. In the reverse arrangement of FIG. 16, key 102′ has an extension which is movable independently of the key while key 103′ has an extension 105′ fixed with rotation to the key. A cross bar 100 fixed on extension 105′ engages an abutment 109 so that when key 103′ is depressed it actuates extension 104′ but depressing key 102′ has no effect upon the other. If key 103′ is depressed, carrying with it 104′, a spring 131 is employed for returning the extension 104′.

FIG. 17 shows a means of varying the carry arrangement from the readout wheels of one row to another. In the usual adding machine when the readout wheel of the first row has reached 9 the next key depressed in the same row produces the carry to the next row. This is done by various means such as a snail cam mechanism shown at 6 in Patent No. 1,917,732. A cam follower is cammed progressively outwardly as the shaft rotates its first nine increments and on the tenth and last increment a linkage between the follower and the second readout wheel moves the latter one increment. The modified snail cam 110 shown in FIG. 16 has two risers 111 and 112 on its periphery. As shaft 114 carrying the cam and the readout wheel is progressively rotated in increments of about 36° the follower 116 rides up the first rise, storing energy in spring 118. The follower reaches the top 119 of the first rise after four increments of rotation and when the follower falls off, return movement of the same under the influence of the spring causes rotation of the next wheel one increment, due to appropriate linkage (not shown) between the follower and the next wheel. After the next five increments the carry again operates. A carry of this type or of any other type may be used to rotate a readout wheel having no other means to produce rotation.

Figure 3:
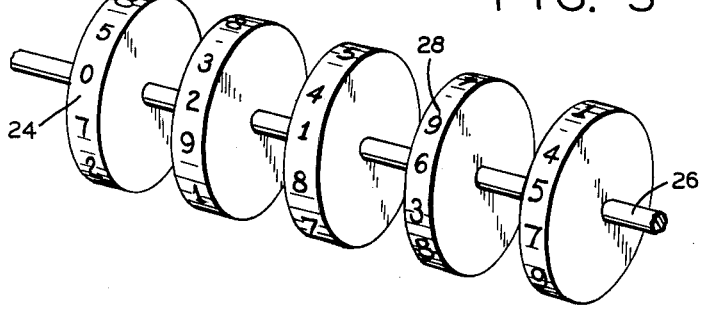
FIG. 3 is a perspective of a typical readout wheel arrangement.
Figure 18:
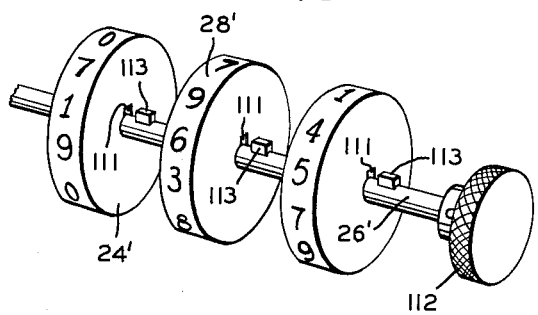
FIG. 18 shows a means of effecting a new setting for all the readout wheels.
Figure 19:
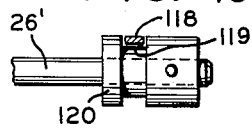
FIG. 19 illustrates a means for preventing movement of the readout wheel shaft.

FIG. 18 illustrates the modification earlier mentioned wherein the entire apparatus can be given an individual setting for each one of several credit organizations. It was earlier pointed out with respect to FIG. 3 that the numeral wheels 24 are mounted for free rotation on shaft 26 and are arranged to be rotated in selected increments when various keys are depressed.

In FIG. 18 each of the wheels 24 have keyways 111 and the shaft 26′ mounted for limited longitudinal movement have a thumb turn 112 located externally of this housing. The shaft also has keys 113 which enter the keyways when the shaft is moved to the left and thus all wheels may be manually rotated one or more increments. It was earlier pointed out that when lever 20 resets the wheels to starting position the readout wheels are not necessarily at zero position and it is preferred that the readout numbers at the starting position be at some position other than zero. For instance, by reference to FIG. 3 it will be assumed that the starting position read 0–2–1–6–5. Each time lever 20 is depressed the wheels come to rest with this reading. If now thumb turn 113 is rotated one increment in a clockwise direction, the starting position will read 7–9–8–3–7. That would be the setting for the "Diners Association," etc., but depressing clearing lever 20 always brings the wheels back to the 0–2–1–6–5 position.

The shaft 24′ should be locked against manual manipulation through the use of thumb turn 112 as long as the shutter is in the open or upward position of FIG. 8 for obvious reasons. Any suitable means for accomplishing this may be used, such for example as a locking key 118, which moves into an annular slot 119 in a collar 120 fast on shaft 26′. This key is the annular slot, so long as the shutter is up as in FIG. 8 and moves out of the slot when the shutter moves down to the closed position of FIG. 7. Any suitable linkage means may be employed connecting the shutter and the key.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A machine for establishing personal identification and comprising a closed frame, a plurality of depressible keys carrying indicia and mounted for movement in the frame, a plurality of readout wheels carrying indicia thereon, means connecting the keys with the wheels to impart varying increments of rotation to the latter when the keys are depressed, and a shutter normally covering said wheels, spring means urging the shutter to open position, a key counter for releasing the shutter to expose said wheels after a predetermined number of keys have been depressed, said key counter including a first member movable in increments as each key is depressed, a second member movable by the first member when the predetermined number of keys have been depressed and releasing the shutter to travel to open position, spring means urging the second member to shutter engaging position and a lever for returning the wheels to starting position after each cycle of operation and engaging the shutter to close the same.

2. The structure recited in claim 1 and provided with stop means for limiting movement of the second member at the end of movement caused by depressing all the keys, and hence locking the keys against further movement.

3. A machine for establishing personal identification and comprising a closed frame, a plurality of depressible keys carrying indicia and mounted for movement in the frame, a plurality of readout wheels carrying indicia thereon, means connecting the keys with the wheels to impart varying increments of rotation to the latter when the keys are depressed, and a shutter normally covering said wheels, a key counter for releasing the shutter to expose said wheels after a predetermined number of keys have been depressed, said key counter including a longitudinally movable rod provided with spring means urging the rod into shutter-engaging position, a lever carried on the rod, a finger responsive to a predetermined number of key depressions to actuate the lever to release the shutter, a lever for returning the wheels to starting position after each cycle of operation, and means connecting the lever to the rod to return the latter to shutter-engaging position.

4. A machine for establishing personal identification and comprising a closed frame, a plurality of depressible keys carrying indicia and mounted for movement in the frame, a plurality of readout wheels carrying indicia thereon, means connecting the keys with the wheels to impart varying increments of rotation to the latter when the keys are depressed, and a shutter normally covering said wheels, spring means urging the shutter to open position, a key counter for releasing the shutter to expose said wheels after a predetermined number of keys have been depressed, said key counter including a longitudinally movable rod provided with spring means urging the rod into shutter-engaging position, a lever carried on the rod, a finger responding to a predetermined number of key depressions to actuate the lever to release the shutter, a lever for returning the wheels to starting position after each cycle of operation, and means connecting the lever with the shutter to close the same and to connect the lever to the rod to return the rod to shutter-engaging position.

5. The structure recited in claim 4 and provided with stop means for limiting further movement of the rod after the last key in the cycle has been depressed, hence preventing further keys being depressed.

References Cited by the Examiner

UNITED STATES PATENTS

| | | | |
|---|---|---|---|
| 1,683,072 | 9/1928 | Hebern | 35—4 |
| 1,953,829 | 4/1934 | Morris | 35—4 |
| 2,209,763 | 7/1940 | Breitling | 235—130 X |
| 2,934,833 | 5/1960 | Burkhard et al. | 35—4 |
| 3,000,486 | 9/1961 | Yeg | 35—3 |

JEROME SCHNALL, *Primary Examiner.*

GEORGE A. NINAS, JR., *Examiner.*